United States Patent
Xu et al.

(10) Patent No.: US 9,900,242 B2
(45) Date of Patent: Feb. 20, 2018

(54) PERFORMANCE-BASED ROUTING METHOD AND DEVICE

(71) Applicant: Huawei Technologies Co., Ltd., Shenzhen (CN)

(72) Inventors: Xiaohu Xu, Beijing (CN); Qing Zeng, Shenzhen (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 742 days.

(21) Appl. No.: 14/227,575

(22) Filed: Mar. 27, 2014

(65) Prior Publication Data

US 2014/0237138 A1    Aug. 21, 2014

Related U.S. Application Data

(63) Continuation of application No. PCT/CN2012/081678, filed on Sep. 20, 2012.

(30) Foreign Application Priority Data

Sep. 30, 2011  (CN) .......................... 2011 1 0297757

(51) Int. Cl.
*G06F 15/173* (2006.01)
*H04L 12/721* (2013.01)
(Continued)

(52) U.S. Cl.
CPC ............ *H04L 45/14* (2013.01); *H04L 45/302* (2013.01); *H04L 69/329* (2013.01); *H04L 45/02* (2013.01); *H04L 45/04* (2013.01); *H04L 45/54* (2013.01)

(58) Field of Classification Search
CPC .............................. H04L 45/14; H04L 45/302
(Continued)

(56) References Cited

U.S. PATENT DOCUMENTS

2007/0064702 A1*  3/2007  Bates ...................... H04L 45/02
                                                          370/392

FOREIGN PATENT DOCUMENTS

CN    101459630 A    6/2009
CN    101610208 A    12/2009
(Continued)

OTHER PUBLICATIONS

Bates et al. (RFC 4760 "multiprotocol extensions for BGP-4", Jan. 2007).*
Fonte, et al., "Interdomain quality of service routing: setting the grounds for the way ahead," Ann. Telecommunication, (2008) Published Nov. 25, 2008, 13 pages.
Phan, et al., "Extension of BGP to Support Multi-domain FICC-Diffserv Architecture," Advanced Research in Networking Laboratory, Apr. 18-20, 2006, 6 pages.
Rekhter, et al., "Inter-Domain Routing Protocol, Version 2," Network Working Group, Jun. 1996, 111 pages.
Bates, et al., "Multiprotocol Extensions for BGP-4," Network Working Group, Jan. 2007, 12 pages.
(Continued)

*Primary Examiner* — Dustin Nguyen
*Assistant Examiner* — Joel Mesa
(74) *Attorney, Agent, or Firm* — Slater Matsil, LLP

(57) ABSTRACT

Embodiments of the present invention relate to the field of communications technologies, and disclose a performance-based routing method and device, which can implement exchange of a performance route by expanding a BGP protocol. A first PCR receives first performance routing information sent by a second PCR. The first performance routing information includes a first performance parameter attribute. It is determined whether a performance route corresponding to the first performance routing information exists in an adjacent routing information base-in Adj-RIB-in of the first PCR. The performance route is added to the Adj-RIB-in when the performance route does not exist in the Adj-RIB-in.

18 Claims, 6 Drawing Sheets

(51) Int. Cl.
  *H04L 12/725*   (2013.01)
  *H04L 29/08*   (2006.01)
  *H04L 12/751*   (2013.01)
  *H04L 12/715*   (2013.01)
  *H04L 12/741*   (2013.01)

(58) Field of Classification Search
  USPC .................................................. 709/238, 240
  See application file for complete search history.

(56) References Cited

FOREIGN PATENT DOCUMENTS

| | | | |
|---|---|---|---|
| CN | 101674241 A | 3/2010 | |
| CN | 101686181 A | 3/2010 | |
| WO | WO 2011080143 A1 * | 7/2011 | ............. H04L 45/02 |

OTHER PUBLICATIONS

International Search Report and Written Opinion received in Application No. PCT/CN2012/081678 dated Dec. 27, 2012, 12 pages.
Rekhter, et al., "Carrying Label Information in BGP-4," Network Working Group, May 2001, 8 pages.
Scudder, et al., "Capabilities Advertisement with BGP-4," Network Working Group, Feb. 2009, 7 pages.
Walton, et al., "Advertisement of Multiple Paths in BGP," Network Working Group, Oct. 16, 2013, 8 pages.

* cited by examiner

… (US 9,900,242 B2)

PERFORMANCE-BASED ROUTING METHOD AND DEVICE

This application is a continuation of International Application No. PCT/CN2012/081678, filed on Sep. 20, 2012, which claims priority to Chinese Patent Application No. 201110297757.8, filed on Sep. 30, 2011, both of which are hereby incorporated by reference in their entireties.

TECHNICAL FIELD

The present invention relates to the field of communications technologies and, in particular embodiments, to a performance-based routing method and device.

BACKGROUND

A BGP (border gateway protocol) is used for transmitting routing information between ASs (autonomous system) and inside an AS. The BGP, as an application layer protocol, runs on a BGP router, and the BGP router stores BGP routing tables, which are an adjacent routing information base-in Adj-RIB-in, an adjacent routing information base-out Adj-RIB-out, and a local routing information base Local-RIB. The BGP maintains one Adj-RIB-in and one Adj-RIB-out for each adjacent BGP. However, the Local-RIB is used for storing routing information that complies with a BGP policy configured for a local device.

After the BGP establishes a session with an adjacency, the BGP router extracts a route from the Local-RIB, performs processing according to an output policy for an adjacent BGP router, puts a route complying with the policy into the Adj-RIB-Out of the BGP router, and sends a route in the Adj-RIB-Out to the adjacent BGP router. The adjacent BGP router puts the received route into the Adj-RIB-In of the adjacent BGP router, so that the BGP makes a decision and performs processing. Currently, the routing information stored in the Local-RIB is mostly selected from the Adj-RIB-in based on a shortest AS-Path (autonomous system-path) attribute policy. From the perspective of user experience, the routing information is not necessarily optimal.

SUMMARY OF THE INVENTION

Embodiments of the present invention provide a performance-based routing method and device, which can implement exchange of a performance route by expanding a BGP protocol.

To achieve the foregoing objective, the embodiments of the present invention adopt the following technical solutions.

In one aspect, a performance-based routing method includes receiving, by a first PCR, first performance routing information sent by a second PCR. The first performance routing information includes a first performance parameter attribute. It is determined whether a performance route corresponding to the first performance routing information exists in an adjacent routing information base-in Adj-RIB-in of the first PCR. The performance route is added to the Adj-RIB-in when the performance route does not exist in the Adj-RIB-in.

Corresponding to the foregoing method, a performance-based first PCR is further provided. The first PCR includes a first performance routing information receiving unit, which is configured to receive first performance routing information sent by a second PCR. The first performance routing information includes a first performance parameter attribute. A determining unit is configured to determine whether a performance route corresponding to the first performance routing information exists in an adjacent routing information base-in Adj-RIB-in of the first PCR. A performance routing information storing unit is configured to add the first performance routing information to the Adj-RIB-in of the first PCR when the performance route corresponding to the first performance routing information does not exist in the Adj-RIB-in of the first PCR.

In the performance-based routing method and device provided by the embodiments of the present invention, exchange of a performance route is implemented and the performance route is used for packet routing, thereby providing better service experience for a user.

BRIEF DESCRIPTION OF THE DRAWINGS

To describe the technical solutions in the embodiments of the present invention or in the prior art more clearly, the following briefly introduces accompanying drawings required for describing the embodiments. Apparently, the accompanying drawings in the following description show merely some embodiments of the present invention, and a person of ordinary skill in the art may further derive other drawings according to these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the embodiments to be described are merely a part rather than all of the embodiments of the present invention. All other embodiments obtained by a person of ordinary skill in the art based on the embodiments of the present invention without creative efforts shall fall within the protection scope of the present invention.

The following describes a performance-based routing method and device provided by the embodiments of the present invention in detail with reference to the accompanying drawings.

Figure 1:
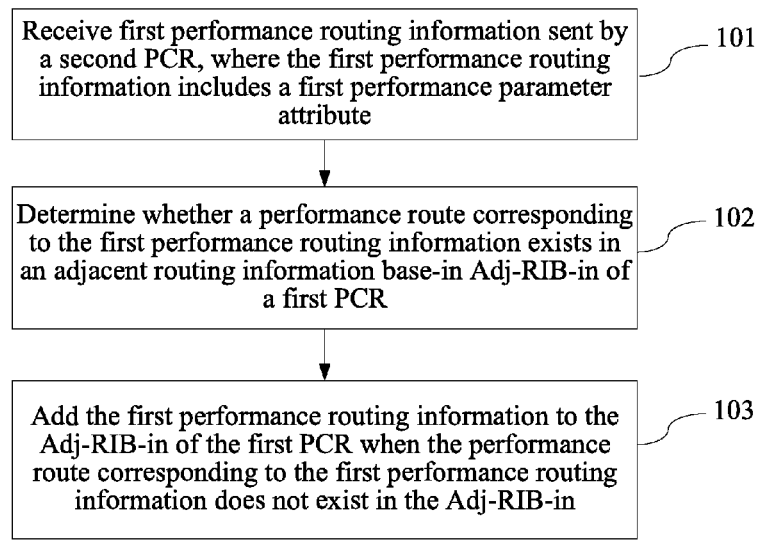
FIG. 1 is a flowchart of a performance-based routing method according to Embodiment 1 of the present invention.

In one aspect, as shown in FIG. 1, a first embodiment (Embodiment 1) of the present invention provides a performance-based routing method, which may be implemented by a first PCR (Performance-routing Capable Router, BGP router with a performance routing capability). The method includes the following steps.

101. Receive first performance routing information sent by a second PCR, where the first performance routing information includes a first performance parameter attribute.

For example, the first performance routing information may further include: network layer reachability information (NLRI) and a path attribute, where a value of a next-hop in the path attribute is an address of the second PCR. The first PCR and the second PCR each are an adjacent PCR to each other, and the first performance parameter attribute includes a network performance parameter between a PCR indicated by next-hop information and a PCR indicated by the network layer reachability information.

In this embodiment, the network performance parameter included in the performance parameter attribute may be a delay, a packet loss rate, and/or a delay jitter, or may be a comprehensive performance parameter that is calculated according to one or more of the foregoing parameters.

For example, the sent performance routing information may be encoded by using a newly defined sub-family to be differentiated from routing information of other address sub-families. The sent performance routing information may also be encoded by using an existing address family/address sub-family. The first performance parameter attribute is carried in a path attribute of the first performance routing information, for example, carried in an existing attribute field, such as MED (Multi-Exit Discriminators) attribute field, of the path attribute, or a newly added attribute field may also be used to carry the performance parameter attribute.

For example, the first performance routing information may further include an MPLS label. The MPLS label is a label allocated by the second PCR for a performance route corresponding to the first performance routing information, so that data forwarding of a data packet can be implemented through MPLS based on the performance route.

For example, the first performance routing information may be sent through a BGP update (update) message.

102. Determine whether a performance route corresponding to the first performance routing information exists in an adjacent routing information base-in Adj-RIB-in of the first PCR.

Here, the performance route corresponding to the first performance routing information is a performance route between a destination PCR and the second PCR.

103. Add the first performance routing information to the Adj-RIB-in of the first PCR when the performance route corresponding to the first performance routing information does not exist in the Adj-RIB-in.

The performance route in the performance-based routing method provided by this embodiment is a routing method based on using a network performance parameter value as a route selection measurement. For example, a network performance parameter may be a parameter such as a delay, a packet loss rate, or a delay jitter, or may also be a comprehensive performance parameter that is calculated by using a specific algorithm with multiple of the foregoing individual performance parameters as an input. For example, the smaller the network performance parameter value in the performance route is, the better the performance is, that is, the better the route is. It should be noted that, a routing advantage is determined based on parameter selection and a specific algorithm corresponding to a parameter. The foregoing definition is only one possible manner for determining the routing advantage.

Further, the method may further include additional steps.

104. Add a second performance parameter attribute to the performance route corresponding to the first performance routing information, where a value of the second performance parameter attribute is based on a value of the first performance parameter attribute and a network performance parameter value from the first PCR to the PCR indicated by the next-hop information in the first performance routing information.

Specifically, the value of the second performance parameter attribute is a network performance parameter value of a route between the first PCR and a destination PCR indicated by the NLRI included in the first performance routing information.

105. Select an optimal performance route from performance routes with same NLRI according to the second performance parameter attribute, and save the optimal performance route and a second performance parameter attribute in the optimal performance route in a local routing information base Loc-RIB of the first PCR.

For example, a performance route in which a value of a second performance parameter attribute is the smallest in performance routes to a certain destination PCR may be used as the optimal performance route to the destination PCR.

For example, the performance-based routing method may further include a further step.

106. If the optimal performance route in the local routing information base of the first PCR is updated, the first PCR notifies an adjacent PCR of the updated optimal performance route.

For example, that the first PCR sends the updated optimal performance route to the adjacent PCR may include the following. The first PCR sets a next-hop in performance routing information sent to the adjacent PCR to itself (the first PCR), and sets a performance parameter attribute to a performance parameter attribute of a performance route from the first PCR to a destination PCR of the updated optimal performance route; or the first PCR sets a next-hop in updated performance routing information sent to the adjacent PCR to an adjacent PCR from which the updated performance routing information is, and sets a performance parameter attribute to a performance parameter attribute of a performance route from the adjacent PCR from which the updated performance routing information is to a destination PCR of the updated performance route; then the performance routing information is sent to the adjacent PCR of the first PCR. For example, if the optimal performance route that includes the second performance parameter attribute and is in the local routing information base of the first PCR is updated, the first PCR notifies the adjacent PCR of the updated optimal performance route in this case.

During the notification, the first PCR may set the next-hop of the performance routing information to the first PCR itself. In this case, a performance parameter attribute of the notified performance routing information is the second performance parameter attribute, that is, the performance parameter attribute of the performance route from the first PCR to the destination PCR indicated by the NLRI in the updated optimal performance route.

If the next-hop of the notified performance routing information is set to the adjacent PCR from which the performance routing information is, that is, the second PCR, the performance parameter attribute of the notified performance routing information in this case is the first performance parameter attribute, that is, the performance parameter attribute of the performance route from the second PCR to the destination PCR indicated by the NLRI in the updated optimal performance route. The NLRI in the performance routing information notified by the first PCR to the adjacent PCR remains unchanged.

Correspondingly, if the performance routing information notified by the first PCR to the adjacent PCR includes MPLS label information, a carried MPLS label is an MPLS label corresponding to a next-hop PCR in the performance routing information. For example, if the next-hop PCR in the performance routing information is the second PCR, the MPLS label is a label allocated by the second PCR; if the next-hop PCR in the performance routing information is the first PCR, the MPLS label is a label allocated by the first PCR.

In the performance-based routing method provided by the embodiment of the present invention, exchange of a performance route is implemented and the performance route is used for packet routing, thereby providing better service experience for a user.

Figure 2:
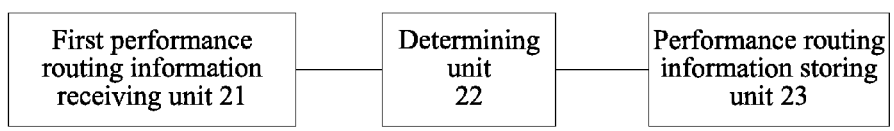
FIG. 2 is a schematic structural diagram of a performance-based first PCR according to Embodiment 2 of the present invention.

As shown in FIG. 2, corresponding to the foregoing method embodiment 1, an embodiment (Embodiment 2) of the present invention provides a performance-based first PCR, including a first performance routing information receiving unit 21, which is configured to receive first performance routing information sent by a second PCR. The first performance routing information includes a first performance parameter attribute. A manner for the first performance routing information receiving unit 21 to receive the performance routing information is the same as that in the foregoing step 101, and is not repeatedly described here.

A determining unit 22 is configured to determine whether a performance route corresponding to the first performance routing information exists in an adjacent routing information base-in Adj-RIB-in of the first PCR. A performance routing information storing unit 23 is configured to add the first performance routing information to the Adj-RIB-in of the first PCR when the performance route corresponding to the first performance routing information does not exist in the Adj-RIB-in of the first PCR. A process for the performance routing information storing unit 23 to add the performance routing information to the Adj-RIB-in is the same as that in the foregoing step 103, and is not repeatedly described here.

Further, the performance-based first PCR may further include a second performance parameter attribute generating unit 24, which is configured to generate a second performance parameter attribute according to a network performance parameter value from the first PCR to a PCR indicated by next-hop information in the first performance routing information and a network performance parameter value in the first performance parameter attribute, and add the second performance parameter attribute to the first performance routing information. A value of the second performance parameter attribute is a network performance parameter value of a route between the first PCR and a destination PCR indicated by NLRI included in the first performance routing information. An optimal performance route selecting unit 25 is configured to select an optimal performance route from performance routes with same NLRI according to the second performance parameter attribute and to save the optimal performance route and the second performance parameter attribute in a local routing information base Loc-RIB of the first PCR. A process for the optimal performance route selecting unit 25 to perform the foregoing operations is the same as that in the foregoing step 105, and is not repeatedly described here.

Further, the performance-based first PCR may further include a routing information notifying unit 26, which is configured to, when the optimal performance route in the local routing information base of the first PCR is updated, notify an adjacent PCR of the updated optimal performance route. A process for the routing information notifying unit 26 to perform the foregoing operation is the same as that in the foregoing step 106, and is not repeatedly described here.

In the performance-based first PCR provided by the embodiment of the present invention, exchange of a performance route is implemented and the performance route is used for packet routing, thereby providing better service experience for a user.

Figure 3:
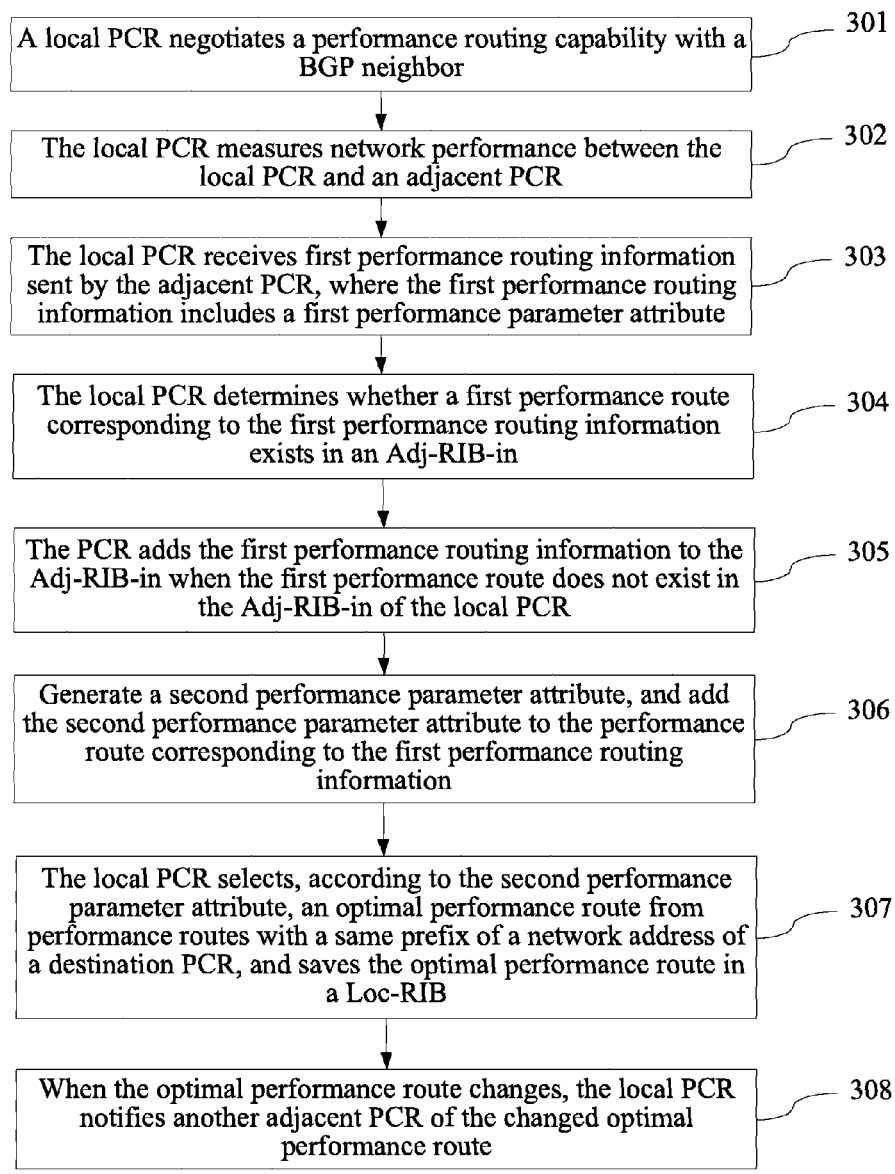
FIG. 3 is a flowchart of a performance-based routing method according to Embodiment 3 of the present invention.

As shown in FIG. 3, an embodiment (Embodiment 3) of the present invention provides a performance-based routing method, which is used for transmitting performance routing information between ASs and inside an AS, where a BGP router inside the AS is connected in a full-mesh (full-mesh) manner. The method includes the following steps.

301. A local PCR negotiates a performance routing capability with a BGP neighbor.

In this step, the local PCR may negotiate the performance routing capability with the BGP neighbor through a BGP multiprotocol expansion capability notification process, so as to negotiate whether the local PCR and the BGP neighbor respectively support sending, processing, and receiving of a performance route.

Specifically, the performance routing capability negotiation may be based on a multiprotocol expansion capability notification process defined in RFC4760, and fields in a capabilities optional parameter in a BGP message are set as follows.

Capability code (capability code)=1 indicates that the BGP message is a multiprotocol BGP (multiprotocol border gateway protocol). An AFI (address family identifier) field in a Capability Value field indicates whether a route transmitted by the performance route is an IPv4 route or IPv6 route. An SAFI (Subsequent Address Family Identifier) field is set to an SAFI code that is individually allocated by an IANA (Internet Assigned Numbers Authority) for the performance route.

In this embodiment, the BGP inside the AS is connected in the full-mesh manner. Therefore, the local PCR may discover all adjacent PCRs inside the AS through the foregoing capability negotiation process. That is, after the performance routing capability negotiation succeeds, the local PCR and an adjacent PCR may discover each other, and if the PCR is an ASBR (autonomous system border router), the PCR may also discover a PCR inside a remote AS which is in EBGP (external border gateway protocol) adjacency with the PCR.

Figure 4:
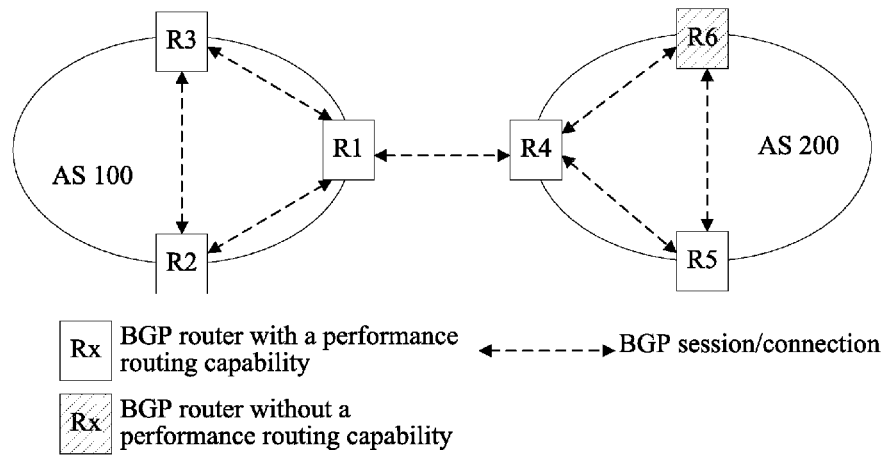
FIG. 4 is a first diagram of network architecture applied in the performance-based routing method according to Embodiment 3 of the present invention.

Specifically, as shown in FIG. 4, a BGP session/connection of a full mesh is established between BGP routers inside an AS100 and an AS200. Through the BGP performance routing capability negotiation process, an R1 discovers that IBGP neighbors R2 and R3 are PCRs, and meanwhile, also discovers that an EBGP neighbor R4 is also a PCR. Similarly, other PCRs may also discover, through performance routing negotiation of an IBGP (Interior Border Gateway Protocol) or an EBGP session, whether their IBGP neighbors or EBGP neighbors are PCRs.

Figure 6:
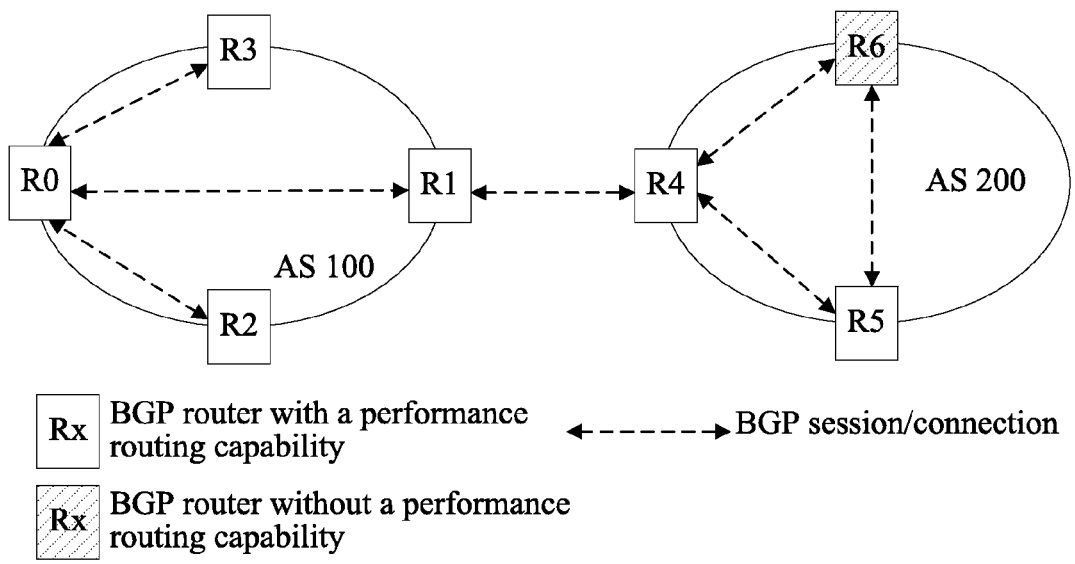
FIG. 6 is a third diagram of network architecture applied in the performance-based routing method according to Embodiment 3 of the present invention.
Figure 7:
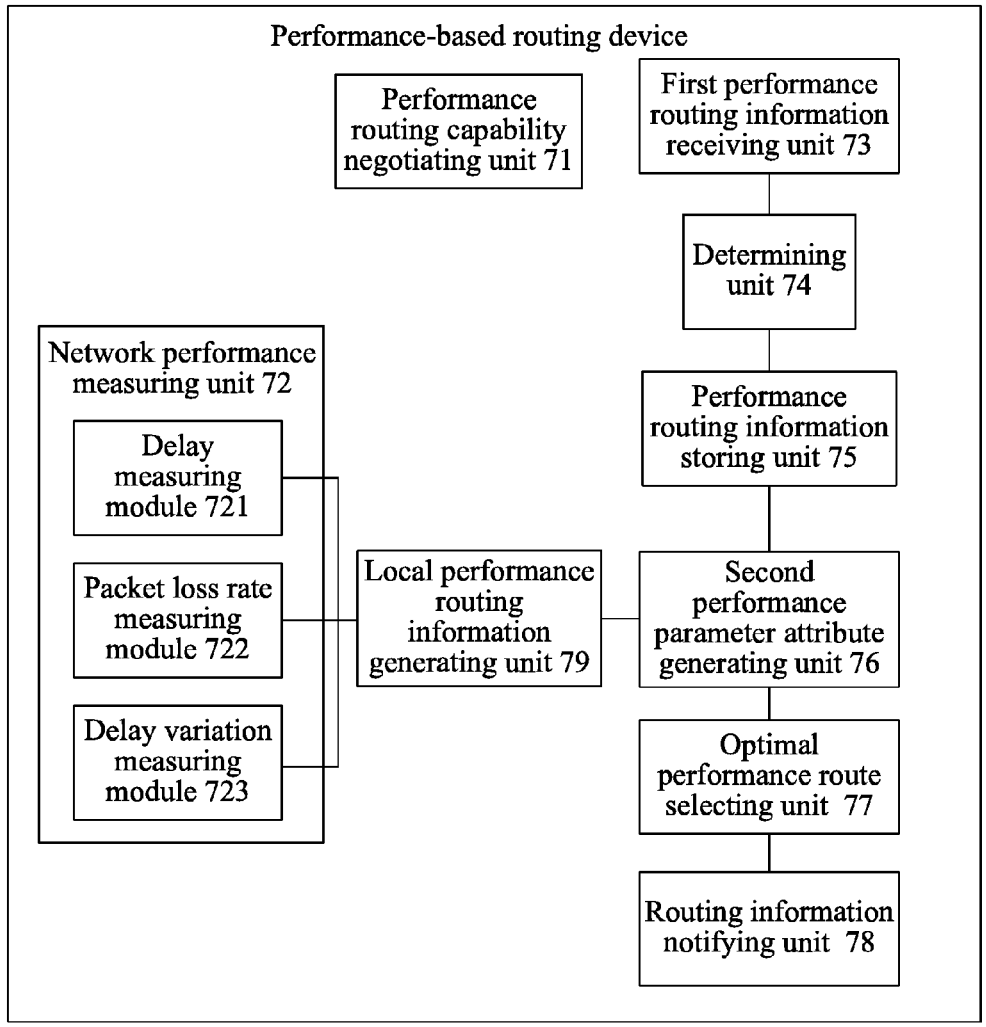
FIG. 7 is a schematic structural diagram of a performance-based first PCR according to Embodiment 4 of the present invention.
Figure 8:
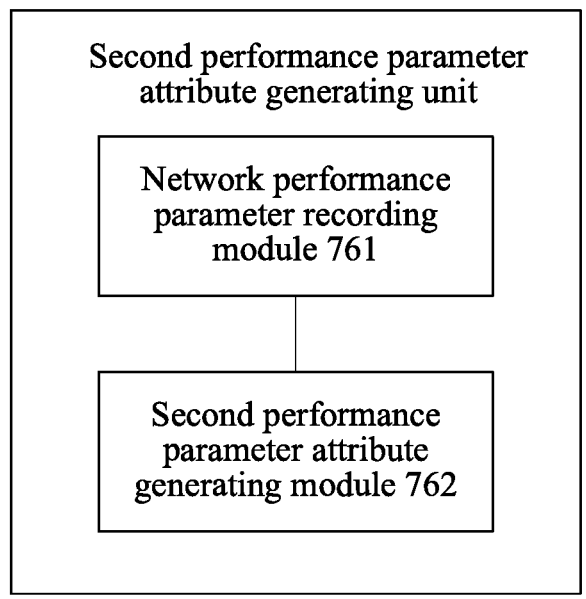
FIG. 8 is a first schematic structural diagram of a second performance parameter attribute generating unit according to Embodiment 4 of the present invention.
Figure 9:
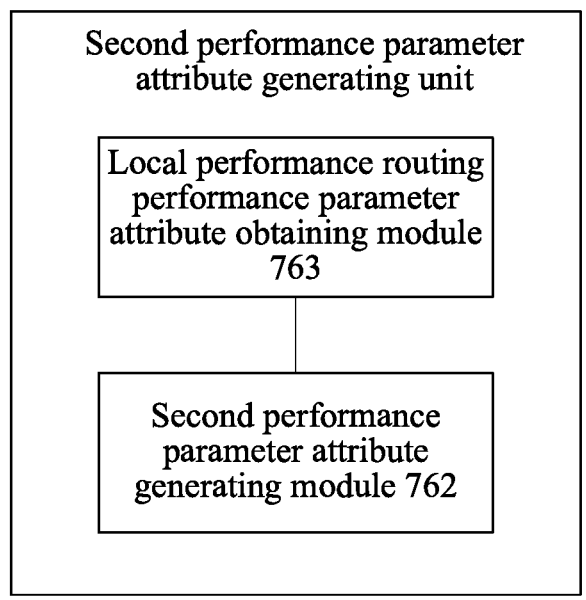
FIG. 9 is a second schematic structural diagram of a second performance parameter attribute generating unit according to Embodiment 4 of the present invention.

When a routing reflector RR is deployed inside the AS, as shown in FIG. 6, an R0 is a routing reflector with the performance routing capability, and an R1 to an R3 are BGP routers PCRs with the performance routing capability. The R1 to the R3 need to notify, inside the AS, a BGP update message carrying an expansion group attribute with a specific meaning, to implement a PCR automatic discovery function inside the AS. When a routing reflector RR is deployed inside the AS, the PCRs that are connected to the RR each are referred to as an adjacent PCR to each other. When the routing reflector RR is deployed inside the AS, the PCR cannot discover all neighbor PCRs inside the AS through step 301 because there is no BGP session/connection between some PCR routers. In this case, after negotiation, the PCR automatic discovery function inside the AS is implemented by distributing the update message carrying an expansion group attribute with a specific meaning to the neighbor PCRs inside the AS. An NRLI field in the update message carries an IP address of the PCR that sends the update message, and the address is also an ID of the PCR.

302. The local PCR measures network performance between the local PCR and the adjacent PCR.

In this step, the PCR may measure the network performance between the PCR and the adjacent PCR; the network performance, for example, may be a delay, a packet loss rate, and/or a delay jitter from the local PCR to the adjacent PCR; the delay, for example, may be round trip time RTT (Round Trip Time). The PCR may measure transmission performance in a periodic measurement manner, or may also use other measurement manners according to requirements. In addition, if the PCR is an ASBR, a delay between the PCR and a PCR inside the remote AS as an EBGP neighbor of the PCR may also be measured.

Figure 5:
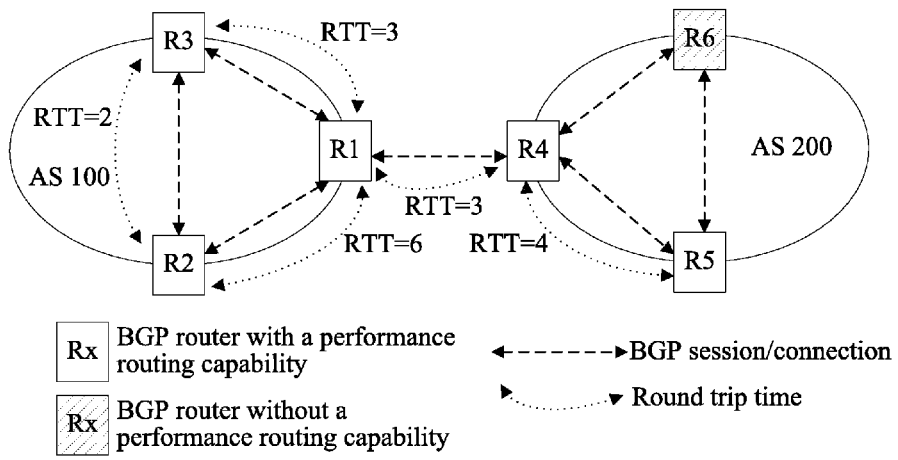
FIG. 5 is a second diagram of network architecture applied in the performance-based routing method according to Embodiment 3 of the present invention.

Specifically, as shown in FIG. 5, PCRs (for example an R1, an R2, and an R3) inside an AS100 perform an RTT measurement for each other. In addition, the R1 as an ASBR of the AS100 and an R4 (that is, an EBGP neighbor of the R1) inside an AS200 perform the RTT measurement for each other. Similarly, PCRs (for example the R4 and an R5) inside the AS200 perform the RTT measurement for each other.

For example, the foregoing measurement of the delay to the adjacent PCR may be implemented in an ICMP (Internet control message protocol) PING (packet Internet groper) manner, and details are not repeatedly described here.

303. The local PCR receives first performance routing information sent by the adjacent PCR, where the first performance routing information includes a first performance parameter attribute.

For example, the first performance routing information includes NLRI and the first performance parameter attribute, where the NLRI is directed to a destination PCR of a first performance route. For example, the sent performance routing information may be encoded by using a newly defined sub-family to be differentiated from routing information of other address sub-families; the sent performance routing information may also be encoded by using an existing address family/address sub-family, where the first performance parameter attribute is carried in a path attribute of the first performance routing information, for example, carried in an existing attribute field, such as MED (Multi-Exit Discriminators) attribute field, of the path attribute, or a newly added attribute field may also be used to carry the performance parameter attribute.

A next-hop in the path attribute may be the adjacent PCR sending the first performance routing information, and in this case, a value of the first performance parameter attribute is a network performance parameter between the adjacent PCR and a destination PCR indicated by the NLRI. Alternatively, a next-hop in the path attribute may be a prefix of an address of another PCR that is different from the adjacent PCR sending the first performance routing information, and in this case, the first performance parameter attribute is a network performance parameter between the another PCR and a destination PCR indicated by the NLRI. The first performance routing information, for example, may be carried in the BGP update message. The first performance routing information may also include an MPLS label that is allocated by the adjacent PCR for the first performance routing information.

For example, the first performance routing information is local performance routing information that is obtained by the adjacent PCR according to network performance of another PCR adjacent to the adjacent PCR obtained through measurement, or optimal performance routing information stored in a local routing information base Loc-RIB in the adjacent PCR. If the first performance routing information is the local performance routing information of the adjacent PCR, for a process of obtaining the local performance routing information, reference may be made to description in the following step 304. For example, the performance parameter attribute of the first performance routing information carries a network performance parameter of a performance route corresponding to the first performance routing information, and the network performance parameter is a delay, a packet loss rate, and/or a delay jitter, or may be a comprehensive performance parameter that is calculated according to one or more of the foregoing parameters.

For example, as shown in FIG. 5, the R1 receives performance routing information sent by the R3, where a prefix of a network address of a destination PCR of the performance routing information is the R2, a performance parameter attribute is round trip time having a value of 2 seconds, a next-hop is the R3, and an MPLS label is 400.

304. The local PCR determines whether a first performance route corresponding to the first performance routing information exists in an Adj-RIB-in.

305. The PCR adds the first performance routing information to the Adj-RIB-in when the first performance route does not exist in the Adj-RIB-in of the local PCR.

306. Generate a second performance parameter attribute, and add the second performance parameter attribute to the performance route corresponding to the first performance routing information, where a value of the second performance parameter attribute is based on the value of the first performance parameter attribute and a network performance parameter value of a route from the first PCR to a PCR indicated by next-hop information in the first performance routing information.

For example, there may be two manners for obtaining the network performance parameter value of the route from the first PCR to the PCR indicated by the next-hop information in the first performance routing information.

Manner 1: Confirm local performance routing information having NLRI in the local performance routing information the same as a next-hop address in the first performance routing information, and then obtain a network parameter value in a performance parameter attribute of the local performance routing information.

For example, a process for the local PCR to generate the local performance routing information is as follows.

The local PCR generates the local performance routing information according to a network performance parameter of a different neighbor PCR obtained through measurement in step 302, where the network performance parameter, for example, may be a delay, a packet loss rate, and/or a delay jitter. The local performance routing information also includes network layer reachability information NLRI (Network Layer Reachability Information) and next-hop (next-hop) information. The NLRI is a destination PCR of a path of the network performance parameter measured by the local PCR. For example, the network performance parameter may be carried in a path attribute of the local performance routing information, and the path attribute may be an existing path attribute or a newly added path attribute. It should be noted that, the local performance routing information may also include an MPLS label. The MPLS label is a label allocated by the local PCR for a performance route corresponding to the local performance routing information, so that data forwarding of a data packet can be implemented in an MPLS manner based on the performance route.

For example, the path attribute of the local performance route carries an RTT delay between the local PCR and the adjacent PCR, the NLRI of the local performance route is the adjacent PCR, a next-hop value of the path attribute of the local performance route is set to an IP address of the local PCR, and the path attribute of the local performance route carries the MPLS label allocated by the local PCR for the local performance route, where the label is unique for the local PCR.

Specifically, taking the R1 shown in FIG. 5 as an example, after the RTT measurement, the R1 generates three local performance routes, which are a performance route with the R2, where network layer reachability information NLRI (Network Layer Reachability Information) of the performance route is an IP address of the R2, an RTT delay is 6 seconds, a next-hop address is the R1 itself, and an allocated MPLS label is 100, a performance route to the R3, where network layer reachability information NLRI (Network Layer Reachability Information) of the performance route is an IP address of the R3, an RTT delay is 3 seconds, a next-hop address is the R1 itself, and an allocated MPLS label is 200, and a performance route to the R4, where network layer reachability information NLRI (Network Layer Reachability Information) of the performance route is an IP address of the R4, an RTT delay is 3 seconds, a next-hop address is the R1 itself, and an allocated MPLS label is 300.

When a routing reflector RR is deployed inside the AS, for example, an RR with the performance routing capability only needs to notifies its performance routing capability in the capability negotiation process, and at other time, does not need to release a special BGP update message for indicating that the RR is a PCR. In this way, PCRs inside other ASs do not need to measure RTT to the RR.

Manner 2: Directly use the recorded network performance parameter value which is between the local PCR and the adjacent PCR and is measured in step 302.

For example, the performance parameter attribute of the generated second performance parameter attribute carries the network performance parameter, where the network performance parameter may be a delay, a packet loss rate, and/or a delay jitter, or a comprehensive performance parameter that is calculated according to one or more of the foregoing parameters. When the carried network performance parameter is a transmission delay, for example, round trip time RTT, the value of the second performance parameter attribute is a sum of the value of the first performance parameter attribute and the network performance parameter value from the local PCR to the PCR indicated by the next-hop information in the first performance routing information. Specifically, as shown in FIG. 5, the R1 receives the performance routing information sent by the R3, where the prefix of the network address of the destination PCR is the R2, the round trip time in the performance parameter attribute is 2 seconds, the next-hop address is the R3, and the MPLS label allocated by the R3 for the route is 400. According to the local performance routing information generated by the R1 from the R1 to the R2 and the received performance routing information sent by the R3, the R1 generates performance routing information from the R1 to the R2 through the R3, where a prefix of a network address of a destination PCR is the R2, round trip time is 3+2=5 seconds, a next-hop address is the R3, and an MPLS label allocated for the performance route is 500. For other PCRs, similar operations may also be performed to generate performance routing information to other PCRs inside the AS100.

The R4 may generate performance routing information to other PCRs inside the AS100 by receiving performance routing information which is from the R1 to other PCRs inside the AS100 and is sent by the R1 and using local performance routing information to the R1, where a process of generating the performance routing information is the same as a process for the R1 to generate the performance routing information, and is not repeatedly described here.

307. The local PCR selects, according to the second performance parameter attribute, an optimal performance route from performance routes with a same prefix of the network address of the destination PCR, and saves the optimal performance route in the Loc-RIB.

Specifically, as shown in FIG. 5, there are two paths from the R1 to the R2, and it is found, according to the performance parameter attribute, that the delay of the route from the R1 to the R2 through the R3 is 5 seconds, which is shorter than the delay value of 6 seconds of the performance route from the R1 directly to the R2. Therefore, a route to the R3 through the R2 is used as the optimal performance route, and its corresponding performance routing information is saved in the Loc-RIB of the R1. For example, the optimal performance route saved in the Loc-RIB of R1 has both the first performance parameter attribute and the second performance parameter attribute.

308. When the optimal performance route changes, the local PCR notifies another adjacent PCR of the changed optimal performance route.

For example, that the local PCR sends the updated optimal performance route to the adjacent PCR may include: The local PCR sets a next-hop in performance routing information sent to the adjacent PCR to the local PCR itself, and sets a performance parameter attribute to a performance parameter attribute of a performance route from the local PCR to a destination PCR to which NLRI of the updated optimal performance route is directed. Alternatively, the local PCR sets a next-hop in updated performance routing information sent to the adjacent PCR to an adjacent PCR of performance routing information from the adjacent PCR according to which the updated performance routing information is generated, and sets a performance parameter attribute to a performance parameter attribute of the performance routing information from the adjacent PCR according to which the performance routing information is updated.

Then, the performance routing information is sent to the adjacent PCR of the local PCR. For example, it is assumed that the first performance routing information that includes the second performance parameter attribute is saved as an optimal route from the R1 to the R2 in the local routing information base of the R1. The R1 notifies the adjacent PCR, for example the R4, of the first performance routing information, and may set a next-hop of the performance routing information to the R1 itself during the notification of the first performance routing information. The performance parameter attribute carried in the notified performance routing information is the second performance parameter attribute. That is, the performance parameter attribute of the performance route from the R1 to the R2 through the R3. If the next-hop of the notified first performance routing information is set to the adjacent PCR from which the first performance routing information is, that is, the R3, the performance parameter attribute of the notified performance routing information is the first performance parameter attribute, that is, the first performance parameter attribute carried when the R3 sends the first performance routing information to the R1. The first performance parameter attribute corresponds to the performance parameter attribute of the performance route from the R2 to the R3. During the notification of the performance route, the NLRI in the performance routing information notified by the first PCR to the adjacent PCR remains unchanged.

Correspondingly, if the performance routing information notified by the first PCR to the adjacent PCR includes MPLS label information, a carried MPLS label is an MPLS label corresponding to a next-hop PCR in the performance routing information. For example, if the next-hop PCR in the performance routing information is the second PCR, the MPLS label is a label allocated by the second PCR; if the next-hop PCR in the performance routing information is the first PCR, the MPLS label is a label allocated by the first PCR.

Specifically, as shown in FIG. 5, the second routing performance information is updated in the Loc-RIB of the R1. The NLRI is the R2, the RTT delay is 5 seconds, the next-hop address is the R3, and the MPLS label is 500. When the R1 notifies the adjacent PCR of the performance route, the R1 may change the next-hop address of the notified performance routing information to the R1 itself, so that the performance routing information notified to the adjacent PCR is: the NLRI is the R2, the round trip time is 5 seconds, the next-hop address is the R1, and the MPLS label is 500. Then the performance routing information is sent to another adjacent PCR, for example, the R4. For another example, the R1 may also notifies the adjacent PCR of the first performance routing information corresponding to the updated optimal performance route, and in this case, the next-hop address of the notified performance routing information should be set to the adjacent PCR from which the first performance routing information is, for example, the R3, so that the performance routing information notified to the adjacent PCR is: The NLRI is R2, the round trip time is 2 seconds, the next-hop address is the R3, and the MPLS label is the label 400 in the first performance routing information; and then the performance routing information is sent to another adjacent PCR, for example, the R4.

After receiving the performance routing information notified by the R1, the R4 may perform step 305 to step 308 to obtain the optimal performance route, and when the optimal performance route is updated, notify the adjacent PCR of the R4 of the new optimal performance routing information.

Further, to prevent a routing loop or repetitive sending, an existing principle of routing notification split-horizon of the BGP is strictly followed, that is, except it is a routing reflector RR, a route learned from an IBGP neighbor cannot be transmitted to other IBGP neighbors.

It should be noted that, the notified performance routing information may be encoded by using a newly defined sub-family to be differentiated from routing information of other address sub-families. The notified performance routing information may also be encoded by using an existing address family/address sub-family. The first performance parameter attribute is carried in a path attribute of the notified performance routing information, for example, carried in an existing attribute field, such as MED (Multi-Exit Discriminators) attribute, of the path attribute, or a newly added attribute field may also be used to carry the performance parameter attribute.

In specific application, when the PCR receives a data packet and a local policy is performance routing forwarding, the PCR finds a corresponding optimal performance route in the Loc-RIB and forwards the data packet according to the corresponding optimal performance route.

When the routing reflector RR is deployed inside the AS, the RR with the performance routing capability enables an Add-path (adding a path) function (for details, see draft-ietf-idr-add-paths), that is, a function of notifying multiple paths, when forwarding the performance routing information. In this way, the RR with the performance routing capability may transmit, to a neighbor PCR of the RR, according to a BGP routing reflection rule, performance routing information notified by each PCR inside the AS, so as to finally ensure that performance routing information sent by the PCR or the neighbor PCR can be received by all PCRs inside the AS. Therefore, when the RR is adopted, a final calculation result of the performance route is not affected; that is to say, the RR only completes distribution and synchronization of the performance route among the PCRs but does not affect the calculation result of the performance route. A specific implementation manner is the same as that in the foregoing steps, and is not repeatedly described here.

In the performance-based routing method provided by the embodiment of the present invention, exchange of a performance route is implemented and the performance route is used for packet routing, thereby providing better service experience for a user.

Corresponding to the foregoing method embodiment 3, an embodiment (Embodiment 4) of the present invention further provides a performance-based first PCR. The performance-based first PCR may be a PCR (Performance-routing Capable Router, BGP router with a performance routing capability).

The performance-based first PCR provided by the embodiment of the present invention is referred to as a local PCR in the following. The performance-based first PCR provided by the embodiment of the present invention includes a performance routing capability negotiating unit 71, which is configured to negotiate a performance routing capability with a BGP neighbor, to confirm whether a peer end supports sending, processing, and receiving of a performance route. A process for the performance routing capability negotiating unit 71 to negotiate the performance routing capability with the BGP neighbor is the same as that in step 301, and is not repeatedly described here.

A network performance measuring unit 72 is configured to measure network performance with an adjacent PCR. For example, the neighbor PCR may be another adjacent PCR inside an AS where the local PCR is located or a PCR as an adjacent ASBR. A process for the network performance measuring unit 72 to measure the network performance with the adjacent PCR is the same as that in step 302, and is not repeatedly described here. Specifically, the network performance measuring unit 72 may include a delay measuring module 721, a packet loss rate measuring module 722, and/or a delay jitter measuring module 723. For example, the network performance measuring unit 72 may measure transmission performance in an ICMP (Internet control message protocol) PING (packet Internet groper) manner.

A first performance routing information receiving unit 73 is configured to receive first performance routing information sent by the adjacent PCR. The first performance routing information includes a first performance parameter attribute. A process for the first performance routing information receiving unit 73 to receive the first performance routing information sent by the adjacent PCR is the same as that in step 303, and is not repeatedly described here.

A determining unit 74 is configured to determine whether a first performance route corresponding to the first performance routing information exists in an Adj-RIB-in. A process for the determining unit 74 to determine whether the first performance route corresponding to the first performance routing information exists in the Adj-RIB-in is the same as that in step 304, and is not repeatedly described here.

A performance routing information storing unit 75 configured to add the first performance routing information to the Adj-RIB-in when the first performance route does not exist in the Adj-RIB-in. A second performance parameter attribute generating unit 76 is configured to generate a second performance parameter attribute according to a performance parameter attribute of a local performance route and the first performance parameter attribute, and add the second performance parameter attribute to the first performance routing information. A process for the second performance parameter attribute generating unit 76 to perform the foregoing operations is the same as that in step 306, and is not repeatedly described here. For example, the second performance parameter attribute generating unit 76 may specifically include a network performance parameter recording module 761, which is configured to record performance parameter information to another adjacent PCR inside the AS or the PCR as the adjacent ASBR. The performance parameter information includes the network performance parameter to the another adjacent PCR inside the AS or the PCR as the adjacent ASBR obtained through measurement by the network performance measuring unit. A second performance parameter attribute generating module 762 is configured to generate a second performance parameter attribute according to a network performance parameter value which is from the local PCR to a PCR indicated by next-hop information in the first performance routing information and is recorded by the network performance parameter recording module 761 and a network performance parameter value in the first performance parameter attribute, and add the second performance parameter attribute to the first performance routing information.

For another example, the second performance parameter attribute generating unit may specifically include a local performance routing performance parameter attribute obtaining module 763, which is configured to confirm local performance routing information in which NLRI in the local performance routing information is the same as a next-hop address in the first performance routing information, and then obtain a network parameter value in a performance parameter attribute of the local performance routing information. A second performance parameter attribute generating module 762 is configured to generate a second performance parameter attribute according to a network performance parameter value which is from the local PCR to a PCR indicated by next-hop information in the first performance routing information and is obtained by the local performance routing performance parameter attribute obtaining module 763 and a network performance parameter value in the first performance parameter attribute, and add the second performance parameter attribute to the first performance routing information.

An optimal performance route selecting unit 77 is configured to select an optimal performance route from performance routes with same NLRI according to the second performance parameter attribute, and save the optimal performance route and the second performance parameter attribute generated for the optimal performance route in a Loc-RIB. A process for the optimal performance route selecting unit 77 to perform the foregoing operations is the same as that in step 307, and is not repeatedly described here. A routing information notifying unit 78 is configured to, when the optimal performance route changes, notify another adjacent PCR of the changed optimal performance route. A process for the routing information notifying unit 78 to perform the foregoing operation is the same as that in step 308, and is not repeatedly described here.

A local performance routing information generating unit 79 is configured to generate local performance routing information to the adjacent PCR, where a performance parameter attribute in the local performance routing information includes a network performance parameter with the adjacent PCR obtained through measurement by the network performance measuring unit 72. A process for the local performance routing information generating unit 79 to generate the local performance routing information to the adjacent PCR is the same as the process of generating the local performance routing information in step 306, and is not repeatedly described here.

When a routing reflector RR is deployed inside the AS where the performance-based first PCR is located, the performance-based first PCR further includes an expansion group attribute notifying unit 710, configured to notify, inside the AS, a BGP update message carrying an expansion group attribute with a specific meaning, to implement an automatic discovery function of the PCR inside the AS.

In the performance-based first PCR provided by the embodiment of the present invention, exchange of a performance route is implemented and the performance route is used for packet routing, thereby providing better service experience for a user.

Through the foregoing description of the implementation manners, a person skilled in the art may clearly understand that the present invention may be implemented through software plus a necessary universal hardware platform, or certainly, may also be implemented through hardware. Based on such understanding, all or a part of the technical solutions of the present invention contributing to the prior art may be embodied in a form of a software product. The computer software product may be stored in a storage medium such as a ROM/RAM, a magnetic disk, or an optical disk, and includes several instructions for instructing a computer device (which may be a personal computer, a server, or a network device, or the like) to perform the methods described in the embodiments or some part of the embodiments of the present invention.

The foregoing description is merely specific implementation manners of the present invention, but is not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A performance-based routing method, comprising:
receiving, by a first performance routing capable router (PCR), first performance routing information sent by a second PCR, wherein the first performance routing information comprises a first performance parameter attribute that carries a network performance parameter of a performance route, and wherein the network performance parameter is a delay, a packet loss rate, or a delay jitter, or a comprehensive performance parameter that is calculated according to one or more of the delay, the packet loss rate, or the delay jitter, and wherein the first performance routing information further comprises a Multi-protocol Label Switching (MPLS) label allocated by the second PCR for the performance route corresponding to the first performance routing information, the first performance routing information being encoded by using a newly defined sub-family to be differentiated from routing information of other address sub-families;
determining, by the first PCR, whether a performance route corresponding to the first performance routing information exists in an adjacent routing information base-in (Adj-RIB-in) of the first PCR; and
adding, by the first PCR, the performance route to the Adj-RIB-in when the performance route does not exist in the Adj-RIB-in;
wherein, before receiving the first performance routing information sent by the second PCR, the method further comprises:
negotiating, by the first PCR and the second PCR, a performance routing capability with their respective border gateway protocol (BGP) neighbors, to confirm whether a peer end supports sending, processing, or receiving of the performance route.

2. The method according to claim 1, wherein the first performance routing information further comprises network layer reachability information and next-hop information of the performance route, the first performance parameter attribute comprising a network performance parameter between a PCR indicated by the next-hop information and an address indicated by the network layer reachability information of the performance route.

3. The method according to claim 2, wherein network performance is measured between PCRs inside an autonomous system (AS) where the first PCR and the second PCR are located and between PCRs of a local autonomous system border router (ASBR) and an adjacent remote ASBR of the AS, to obtain the network performance parameter.

4. The method according to claim 1, wherein the negotiating comprises negotiating, by the first PCR and the second PCR, the performance routing capability with their respective BGP neighbors through a BGP multiprotocol expansion capability notification process.

5. The method according to claim 1, wherein automatic discovery of a PCR inside the AS is completed through the performance routing capability negotiation process when a BGP connection inside an autonomous system (AS) where the PCR is located is a full mesh.

6. The method according to claim 1, wherein when a routing reflector RR is deployed inside an autonomous system (AS) where the PCR is located, the PCR needs to notify, inside the AS, an update message carrying an expansion group attribute with a specific meaning, to implement automatic discovery of a PCR inside the AS.

7. The method according to claim 1, further comprising adding a second performance parameter attribute to the performance route corresponding to the first performance routing information, wherein a value of the second performance parameter attribute is based on a value of the first performance parameter attribute and a network performance parameter value from the first PCR to a PCR indicated by next-hop information in the first performance routing information.

8. The method according to claim 7, wherein when the second performance parameter attribute is a transmission delay between PCRs, the value of the second performance parameter attribute is a sum of the value of the first performance parameter attribute and the network performance parameter value from the first PCR to the PCR indicated by the next-hop information in the first performance routing information.

9. The method according to claim 7, further comprising using, by the first PCR, a performance route in which a performance parameter attribute value is the smallest in performance routes with same NLRI as an optimal performance route, and saving the optimal performance route and the second performance parameter attribute generated for the optimal performance route in a local routing information base (Loc-RIB).

10. The method according to claim 9, further comprising, when the optimal performance route in the Loc-RIB changes, sending, by the first PCR, a new optimal performance route to an adjacent PCR, wherein when a value of a next-hop attribute in the new optimal performance route sent to the adjacent PCR is set to the second PCR, the value of the first performance parameter attribute is used as the value of the performance parameter attribute of the performance routing information sent to an adjacent PCR of the first PCR, and when the value of the next-hop attribute of the new optimal performance route sent to the adjacent PCR of the first PCR is set to the first PCR, the value of the second performance parameter attribute is used as the value of the performance parameter attribute of the performance routing information sent to the adjacent PCR of the first PCR.

11. A performance-based performance routing capable router (PCR), comprising:
a processor; and
a non-transitory computer-readable storage medium storing a program to be executed by the processor, the program instructing the processor to:
receive first performance routing information sent by a second PCR, wherein the first performance routing information comprises a first performance parameter attribute that carries a network performance parameter of a performance route, and wherein the network performance parameter is a delay, a packet loss rate, or a delay jitter, or a comprehensive performance parameter that is calculated according to one or more of the delay, the packet loss rate, or the delay jitter and wherein the first performance routing information further comprises a Multi-protocol Label Switching (MPLS) label allocated by the second PCR for the performance route corresponding to the first performance routing information, the first performance routing information being encoded by using a newly defined sub-family to be differentiated from routing information of other address sub-families;
determine whether a performance route corresponding to the first performance routing information exists in an adjacent routing information base-in (Adj-RIB-in) of the PCR; and add the first performance routing information to the Adj-RIB-in of the PCR when the performance route corresponding to the first performance routing information does not exist in the Adj-RIB-in of the PCR;

wherein before receiving the first performance routing information sent by the second PCR, the program further instructs the processor to:

negotiate a performance routing capability with a border gateway protocol (BGP) neighbor, to confirm whether a peer end supports sending, processing, and receiving of the performance route, wherein the second PCR also negotiates a performance routing capability with a BGP neighbor of the second PCR, to confirm whether the peer end supports sending, processing, or receiving of the performance route.

12. The PCR according to claim 11, wherein the program further instructs the processor to add a second performance parameter attribute to the performance route corresponding to the first performance routing information, wherein a value of the second performance parameter attribute is based on a value of the first performance parameter attribute and a network performance parameter value from the PCR to a PCR indicated by next-hop information in the first performance routing information.

13. The PCR according to claim 12, wherein the program further instructs the processor to select an optimal performance route from performance routes with same NLRI according to the second performance parameter attribute, and save the optimal performance route and the second performance parameter attribute generated for the optimal performance route to a local routing information base (Loc-RIB) of the PCR.

14. The PCR according to claim 12, wherein the program further instructs the processor to:

record performance parameter information to another adjacent PCR inside an autonomous system (AS) or a PCR as an adjacent ASBR, wherein the performance parameter information comprises the network performance parameter to the another adjacent PCR inside the AS or the PCR as the adjacent ASBR obtained through measurement by a network performance measuring unit; and generate a second performance parameter attribute according to a network performance parameter value which is from a local PCR to a PCR indicated by next-hop information in the first performance routing information and is recorded and a network performance parameter value in the first performance parameter attribute, and add the second performance parameter attribute to the first performance routing information.

15. The PCR according to claim 12, wherein the program further instructs the processor to:

confirm local performance routing information in which NLRI in the local performance routing information is the same as a next-hop address in the first performance routing information, and then obtain a network parameter value in a performance parameter attribute of the local performance routing information; and generate a second performance parameter attribute according to a network performance parameter value which is from the PCR to a PCR indicated by next-hop information in the first performance routing information and a network performance parameter value comprised in the first performance parameter attribute, and add the second performance parameter attribute to the first performance routing information.

16. The PCR according to claim 11, wherein the program further instructs the processor to notify an adjacent PCR of an updated optimal performance route, when an optimal performance route in a local routing information base of the PCR is updated.

17. The PCR according to claim 11, wherein the program further instructs the processor to measure network performance with an adjacent PCR.

18. A performance-based performance-routing capable router (PCR), comprising:

means for receiving first performance routing information sent by a second PCR, wherein the first performance routing information comprises a first performance parameter attribute that carries a network performance parameter of a performance route, and wherein the network performance parameter is a delay, a packet loss rate, or a delay jitter, or a comprehensive performance parameter that is calculated according to one or more of the delay, the packet loss rate, or the delay jitter and wherein the first performance routing information further comprises a Multi-protocol Label Switching (MPLS) label allocated by the second PCR for the performance route corresponding to the first performance routing information, the first performance routing information is encoded by using a newly defined sub-family to be differentiated from routing information of other address sub-families;

means for determining whether a performance route corresponding to the first performance routing information exists in an adjacent routing information base-in Adj-RIB-in of the PCR; and means for adding the first performance routing information to the (Adj-RIB-in) of the PCR when the performance route corresponding to the first performance routing information does not exist in the Adj-RIB-in of the PCR;

wherein, before receiving the first performance routing information sent by the second PCR, the PCR further comprises:

means for negotiate a performance routing capability with a border gateway protocol (BGP) neighbor, to confirm whether a peer end supports sending, processing, and receiving of the performance route, wherein the second PCR also negotiates a performance routing capability with a BGP neighbor of the second PCR, to confirm whether the peer end supports sending, processing, or receiving of the performance route.

* * * * *